United States Patent [19]

Costello et al.

[11] 4,401,091
[45] Aug. 30, 1983

[54] TEMPERATURE CONTROLLED FUEL HEATER

[75] Inventors: Norman F. Costello; Dennis C. Granetzke, both of Racine, Wis.

[73] Assignee: Modine Manufacturing Company, Racine, Wis.

[21] Appl. No.: 286,568

[22] Filed: Jul. 24, 1981

[51] Int. Cl.³ .......................................... F02M 31/00
[52] U.S. Cl. ..................................... 123/557; 123/552
[58] Field of Search .................. 123/557, 552; 165/35; 251/86

[56] References Cited

U.S. PATENT DOCUMENTS 1,318,068 10/1919 Giesler ............................... 123/557
2,670,933 3/1954 Bay .
2,788,176 4/1957 Andersen .
2,881,828 4/1959 McGinnis .
3,472,214 10/1969 Moon .
3,768,454 10/1973 Markland .
4,231,342 11/1980 Johnston .

4,367,717 1/1983 Ray ..................................... 123/557

FOREIGN PATENT DOCUMENTS 490631 2/1954 Italy ..................................... 165/35

Primary Examiner—Ronald H. Lazarus
Attorney, Agent, or Firm—Wood, Dalton, Phillips, Mason & Rowe

[57] ABSTRACT

A fuel heater having a fuel passage through the heater and heated means as a part of the heater with a valve movable between first and second positions, the valve at the first position directing the fuel through a first path in heat receiving relationship with the heated means and at the second position directing substantially all the fuel through a second path away from the heated means so that the fuel is not substantially heated and movable temperature responsive means responsive to the temperature of the fuel in the heater for moving the valve means between the first and second positions, valve means directing portions of the fuel through both said paths when between said first and second positions.

14 Claims, 6 Drawing Figures

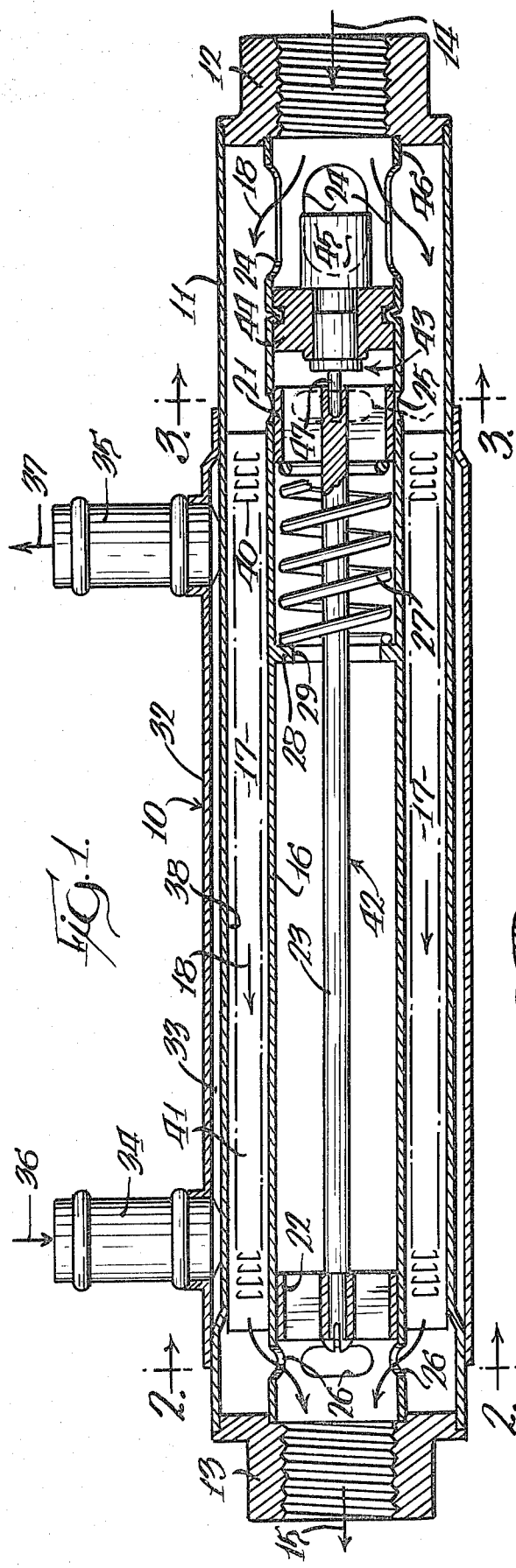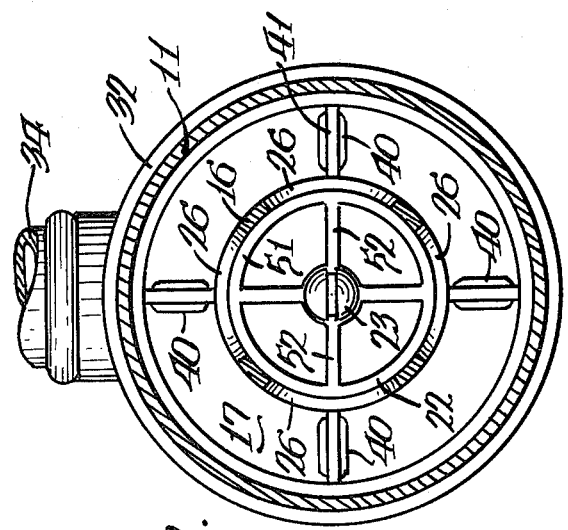

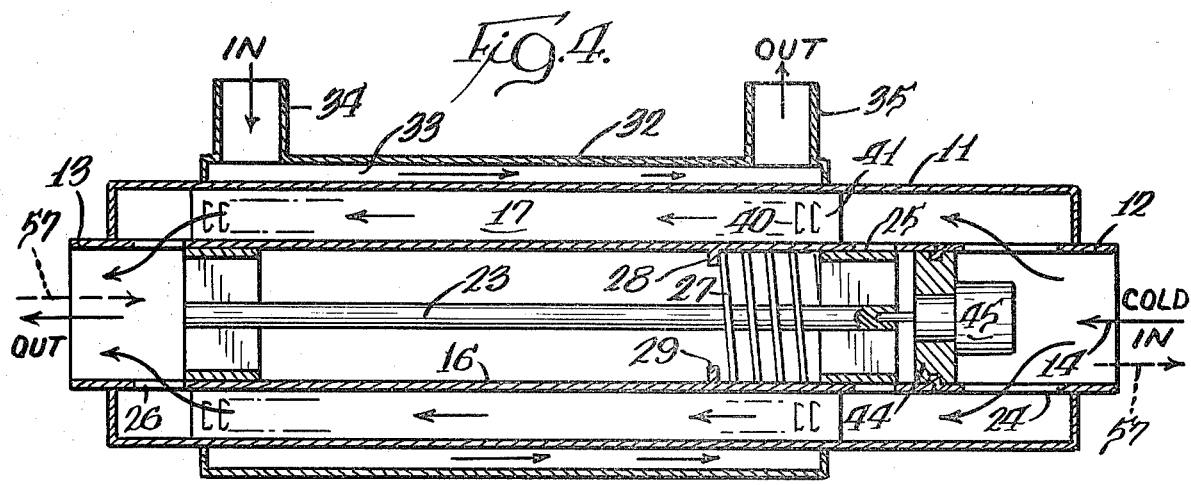
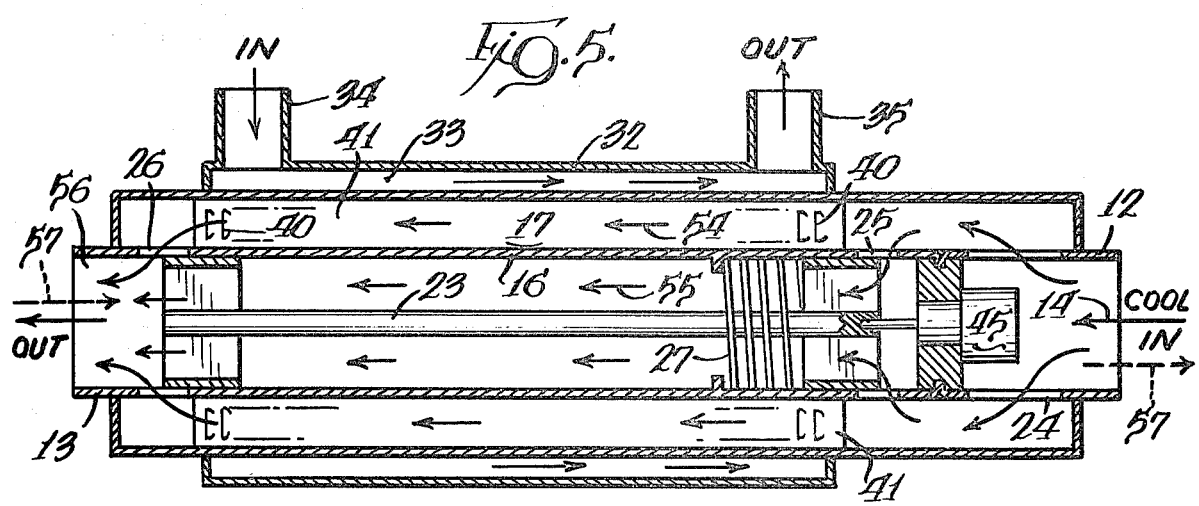
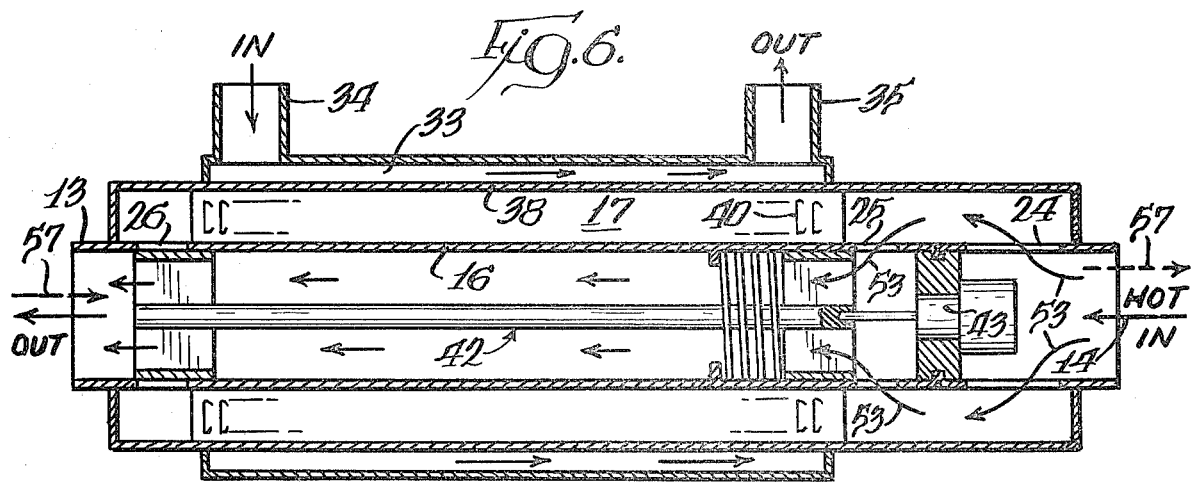

4,401,091

TEMPERATURE CONTROLLED FUEL HEATER

BACKGROUND OF THE INVENTION

Engines, and particularly diesel engines, require fuel heaters during cold weather to prevent precipitation of wax from the fuel which tends to plug screens and fuel injectors. Heating of the fuel will correct this, but it is very easy to overheat the fuel, which gives it an abnormally low density which will have an effect on the fuel metering system.

The present invention overcomes these problems as the new heater includes a temperature control system having a fuel temperature-actuated valve means for bypassing either completely or partially the heated means in the heater from which the fuel is adapted to receive heat when such fuel heating is unnecessary. Because the operation of the valve is controlled by the temperature of the fuel in the heater, it is self-regulating to provide the proper amount of heat to the fuel.

The best prior art of which Applicants are aware consists of the following U.S. patents, none of which disclose the invention as claimed herein: Bay U.S. Pat. No. 2,670,933; Andersen U.S. Pat. No. 2,788,176; McGinnis U.S. Pat. No. 2,881,828; Moon U.S. Pat. No. 3,472,214; Markland U.S. Pat. No. 3,768,454; and Johnston U.S. Pat. No. 4,231,342.

BRIEF DESCRIPTION OF THE DRAWINGS

FIG. 1 is a longitudinal axial sectional view through a fuel heater embodying the invention;

FIGS. 2 and 3 are transverse sectional views along lines 2—2 and 3—3 of FIG. 1, respectively;

FIGS. 4-6 are semi-schematic views showing the operating parts of the valve in position when the incoming fuel is cold, cool and hot.

BRIEF DESCRIPTION OF THE ILLUSTRATED EMBODIMENT

The fuel heater 10 in the illustrated embodiment comprises an elongated tubular body 11 having opposite ends 12 and 13 providing an inlet passage 14 and an outlet 15. Concentric with the body 11 and coaxial thereto is a bypass tube 16 with the annular flow passage 17 between the tubes 11 and 16 providing an elongated annular space through which the incoming fuel flows as indicated by the arrows 18 under certain operating conditions of the heater.

Within the bypass tube 16 is located a valve means comprising a first cylindrical valve body 21 and a second cylindrical valve body 22 spaced therefrom with both mounted on an axial rod 23.

The bypass tube 16 is provided with a first set of circumferentially arranged, spaced openings 24 adjacent the inlet 14, a second set of circumferentially spaced openings 25 positioned adjacent to the first set 24 and a third set of similar openings 26 adjacent to the outlet 15.

The first valve body 21 is constantly urged toward the right as shown in FIG. 1 to close the openings 25 as illustrated in this Figure. This urging is by a helical spring 27 having one end bearing against the valve body 21 and the other end bearing against a partition 28 that is integral with the tube 16 and has a central fluid opening 29. Thus, the spring 27 comprises yieldable means constantly urging the movable valve means 21 and 22 toward the first position of FIG. 1. In this position, the valve openings 25 are closed by the valve body 21 while the openings 26 remain open due to the retracted position of the valve structure that includes the valves 21 and 22 and the rod 23 on which they are mounted. This first position is illustrated both in FIG. 1 and FIG. 4 where the incoming fuel 14 is relatively cold directs this fuel in the flow path 18 through the annular passage 17 so that the fuel may be heated.

In order to provide this heat, the body 11 is provided with a concentric outer water jacket 32.

This water jacket 32 encloses a hot water chamber 33 that is supplied with hot water as from the cooling system of the diesel engine through an inlet fitting 34 and an outlet fitting 35. Flow of hot water into and through the chamber 33 is illustrated by the arrows 36 and 37. The water jacket 33 heats the tubular body 11 which functions as a heated surface means at the surface 38 from which the flowing fuel 18 receives heat.

In order to aid the efficient heat transfer of heating from the jacket 33 to the fuel 18, there are provided spaced radial fins 41 extending radially across the passage 17 with these fins provided with turbulizing louvers 40 for aid in efficient heat transfer from the jacket to the fuel.

In order to move the valve 42 comprising the valve bodies 21 and 22 and axial rod 23, there is provided a temperature responsive means 43 held in a solid thermostat ring 44 extending across and crimped to the tube 16. The temperature responsive thermostat 43 comprises a temperature sensing element 45 located within the entrance end 46 of the tube 16 to be contacted by the incoming fuel. This thermostat 43 is provided with a plunger rod 47 that engages the rod 23 for actuating bypass valve 42.

The cross-sectional details of the valve bodies 21 and 22 are illustrated in FIGS. 2 and 3.

The end of the tube 16 outwardly of the above body 22 contains the circumferential flow means 26. The valve body 22 mounted on the rod 23 comprises a cylinder 51 and spaced webs 52 on which the cylinder is mounted for sliding movement relative to the inner surface of the tube 16.

The valve body 21 is of similar construction with the body 16 and contains the fluid openings 25 that are adapted to be closed and opened by the cylindrical valve body 21 which is also mounted by means of webs 53 on the end of the rod 23 that is opposite to the end on which the valve body 22 is mounted.

With the parts in the position illustrated in FIGS. 1 and 4 in which the incoming liquid 14 is relatively cold, the thermostat 43 retains the valve bodies 21 and 22 in retracted position to close the openings 25 and open the openings 26. The incoming cold fuel 14 thereupon passes outwardly through the openings 24, through the annular passage 17 where it is heated by contact with the hot surface 38 and then flows inwardly through the openings 26 and outwardly through the outlet passage 13.

When the incoming fuel 14 is hot, such as above about 80° F. as illustrated in FIG. 6, the thermostat 43 forces the valve 42 to the left to open passages 25 and close passages 26.

In this position, the hot fuel 14 enters in the same way as in FIG. 1, flows upwardly through the passages 24 but then immediately flows inwardly through the passages 25 as indicated by the arrows 53 so that the already hot fuel flows axially through the bypass tube 16 and outwardly through the outer end 13 without substantially contacting the heated surface 38.

When the temperature of the incoming fuel 14 reaches approximately 80° F., for example, or is fluctuating above and below this temperature, the valve bodies 21 and 22 are in an intermediate position in which the openings 25 and 26 are partially but not completely closed. This arrangement, as illustrated in FIG. 5 where the incoming fuel is identified as "cool," the fuel is divided into two paths, a portion 54 passing through the annular passage 17 while the remainder flows inwardly through the openings 25 and through the bypass tube 16. The portion 54 which is heated leaves the portion 55 which is not heated and re-unites in the outlet passage 56 for flow from the fuel heater.

In the illustrated embodiment, the incoming fuel 14 initially and immediately contacts the sensing element 45 of the thermostat 43. If the incoming fuel is cold, it is directed entirely as indicated by the arrows 18 through the annular passage 17 where it is heated by the hot medium which is hot water in the chamber 33. Because a portion of the fuel is circulated back to the fuel tank, this gradually raises the temperature of the fuel in the tank until the desired temperature is achieved, such as the above-mentioned 80° F. Then, as the temperature rises, the element 45 senses this temperature and adjusts the positions of the valve bodies 21 and 22 accordingly as explained above.

If desired, this same fuel heater could be used but with the flow reversed as indicated by the arrows 57. In this flow direction, which is from left to right in the illustrated embodiment, the fuel does not contact the thermostat sensor 45 until after it has passed substantially through the heater.

We claim:

1. A fuel heater, comprising a source of fuel:
   passage means for said fuel through said heater;
   heated means;
   valve means movable between a first position and a second position, said valve means at said first position directing substantially all said fuel through a first path in heat receiving relationship with said heated means and at said second position directing substantially all said fuel through a second path away from said heated means; and
   movable temperature responsive means responsive to the temperature of said fuel in said heater for moving said valve means between said first and second positions, said valve means directing portions of said fuel through both said paths when between said positions.

2. The heater of claim 1 wherein there is provided an elongated valve body in which is located said passage means, heated means, valve means and temperature responsive means.

3. The heater of claim 1 wherein said heater is provided with an entrance end and an exit end for said fuel with said valve means extending between said ends, said heated means being located intermediate said ends and said temperature responsive means being located adjacent to one of said ends.

4. The heater of claim 1 wherein said temperature responsive means is located at said entrance end.

5. The heater of claim 1 wherein there is provided a chamber for hot liquid comprising said heated means.

6. The heater of claim 1 wherein there is provided a chamber for hot liquid comprising said heated means and flow connections for directing a hot liquid through said chamber.

7. The heater of claim 1 wherein there is provided an elongated body having a heated surface means comprising said heated means, said valve means in said first position directing fuel flowing through the heater in contact with said heated surface means and in said second position directing said fuel away from said surface means.

8. The heater of claim 1 wherein there is provided an elongated, generally cylindrical body member provided with a chamber for a hot liquid comprising said heated means, said first path comprising an annular fuel flow chamber adjacent to said heated means and said second path comprising an axial passage spaced from said chamber.

9. The heater of claim 1 wherein said valve means comprises an elongated member having a pair of spaced valve members arranged for conjoint sliding movement by said temperature responsive means for closing and opening spaced valve ports comprising portions of said second path.

10. The heater of claim 1 wherein there are provided yieldable means constantly urging said movable valve means toward said first position.

11. The heater of claim 1 wherein there is provided an elongated valve body in which is located said passage means, heated means, valve means and temperature responsive means, and wherein said heater is provided with an entrance end and an exit end for said fuel with said valve means extending between said ends, said heated means being located intermediate said ends and said temperature responsive means being located adjacent to one of said ends.

12. The heater of claim 1 wherein there is provided a chamber for hot liquid comprising said heated means and flow connections for directing a hot liquid through said chamber, and wherein there is provided an elongated body having a heated surface means comprising said heated means, said valve means in said first position directing fuel flowing through the heater in contact with said heated surface means and in said second position directing said fuel away from said surface means.

13. The heater of claim 1 wherein there is provided an elongated, generally cylindrical body member provided with a chamber for a hot liquid comprising said heated means, said first path comprising an annular fuel flow chamber adjacent to said heated means and said second path comprising an axial passage spaced from said second chamber, and wherein said valve means comprises an elongated member having a pair of spaced valve members arranged for conjoint sliding movement by said temperature responsive means for closing and opening spaced valve ports comprising portions of said second path.

14. The heater of claim 13 wherein there are provided yieldable means constantly urging said movable valve means toward said first position.

* * * * *